Jan. 7, 1941.   J. E. GRANT   2,227,898
DISPLAY DEVICE
Filed Nov. 20, 1939   2 Sheets-Sheet 2
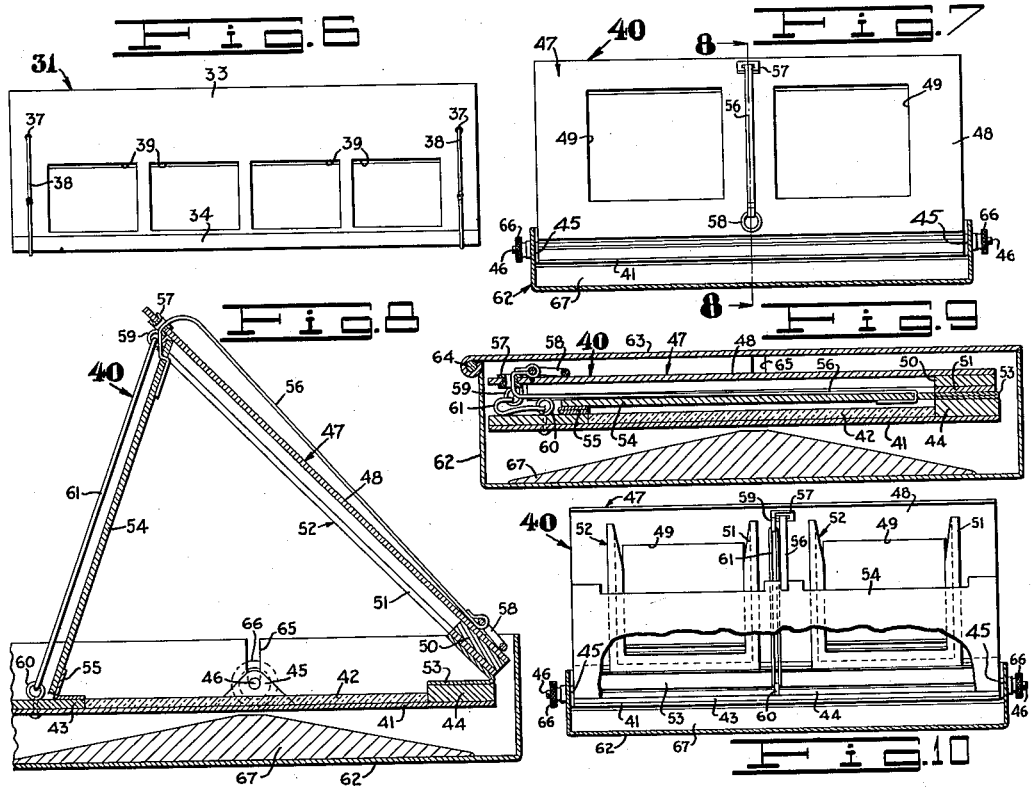
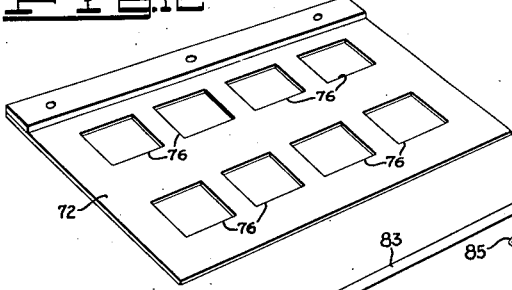
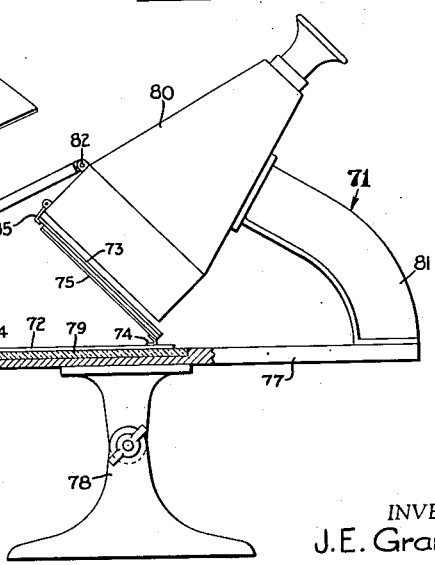
INVENTOR.
J. E. Grant.
BY
ATTORNEY.

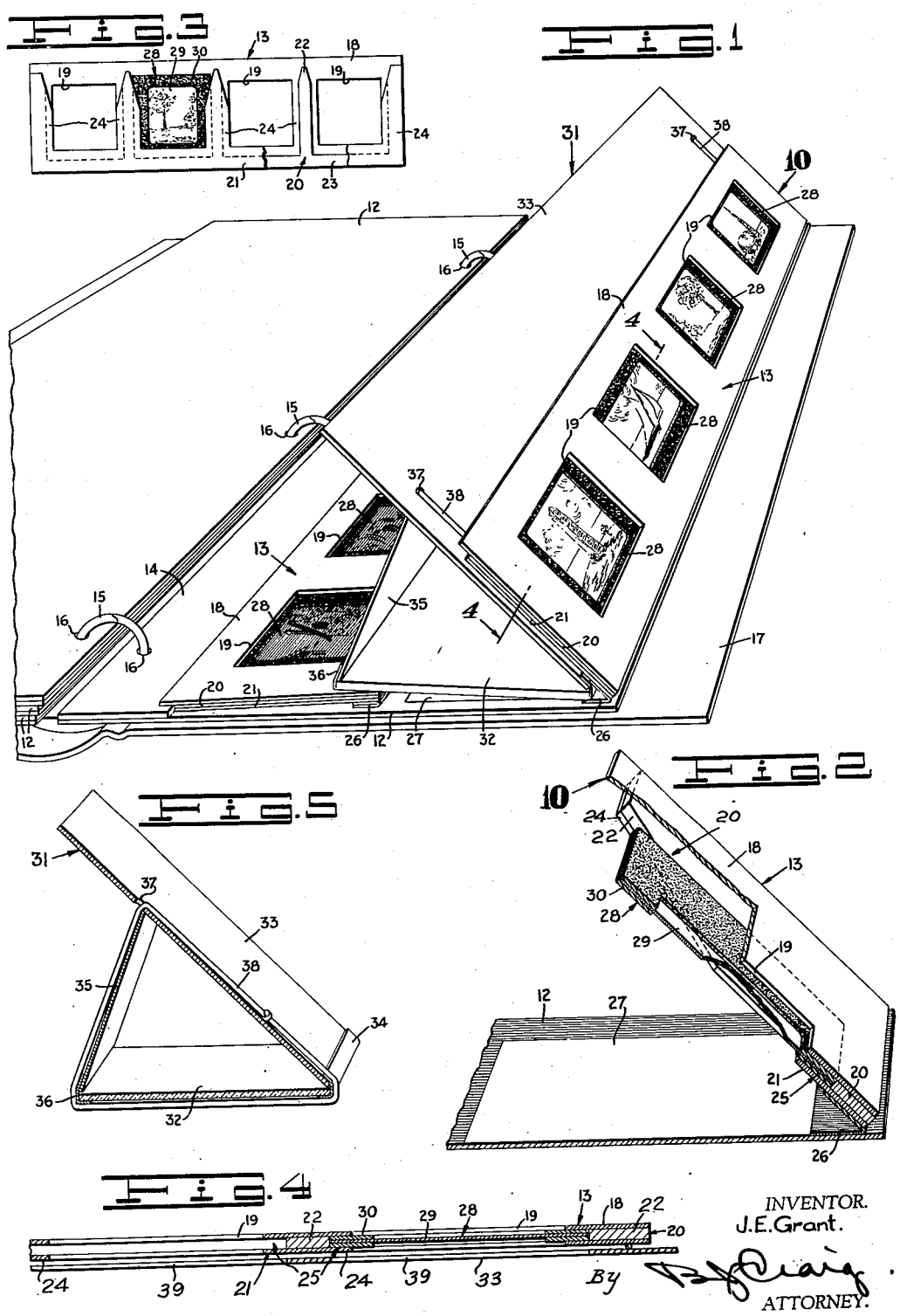
Jan. 7, 1941. J. E. GRANT 2,227,898
DISPLAY DEVICE
Filed Nov. 20, 1939 — 2 Sheets-Sheet 1
INVENTOR.
J. E. Grant.
ATTORNEY.

Patented Jan. 7, 1941

2,227,898

UNITED STATES PATENT OFFICE 2,227,898

DISPLAY DEVICE

Joseph E. Grant, Beverly Hills, Calif.

Application November 20, 1939, Serial No. 305,297

9 Claims. (Cl. 40—152.2)

This invention relates to improvements in holders for transparencies such as films.

The general object of the invention is to provide an improved holding device for a developed, colored, film.

A further object of the invention is to provide an improved film holder including novel film viewing means.

Another object of the invention is to provide a novel film holder and viewing means which is adapted to be placed in a loose leaf binder.

Other objects and the advantages of this invention will be apparent from the following description taken in connection with the accompanying drawings, wherein:

Fig. 1 is a fragmentary perspective view of a plurality of my film holders mounted in a loose leaf binder;

Fig. 2 is an enlarged fragmentary cross sectional perspective view of a film holder showing it in an open position;

Fig. 3 is a rear view, partly broken away, of one of the holder strips removed from the base and on a reduced scale;

Fig. 4 is an enlarged fragmentary section taken on line 4—4 of Fig. 1 with one of the films omitted;

Fig. 5 is an enlarged fragmentary cross sectional perspective view of the reflector device;

Fig. 6 is a front view of the reflector device on a reduced scale;

Fig. 7 is a front view partly in section of a modification of my invention;

Fig. 8 is an enlarged fragmentary section taken on line 8—8 of Fig. 7;

Fig. 9 is a view similar to Fig. 8 showing the device in a closed position;

Fig. 10 is a rear view, partly in section, and partly broken away of the device shown in Fig. 7;

Fig. 11 is a side view, partly in section, of a stereopticon view device for use with my film holder; and Fig. 12 is a perspective view of the base member used for stereopticon film holders.

Referring to the drawings by reference characters I have indicated my improved film holder and viewer generally at 10. As shown the device 10 includes a base member 12 which is preferably made of cardboard and on which is mounted one or more film holders indicated at 13. Adjacent one side on the face of the base 12 I provide a reinforcing strip of cardboard 14 which together with the base is perforated as at 15 to receive the binder rings 16 of a loose leaf binder cover 17.

Each of the film holders 13 includes an enlarged fragmentary cardboard face plate 18 having a plurality of polygonal apertures 19 therein, a cardboard spacing member 20 and a cardboard back member 21.

Between the apertures 19 and between the outer apertures 19 and the end of the face plate 18 the spacing member 20 includes finger portions 22, the ends of which are tapered and the sides of which are spaced from the edges of the apertures 19. The finger portions 22 are connected by an integral lower bar portion 23 the upper edge of which is spaced below the lower edge of the apertures 19.

The back member 21 overlaps the spacer member 20 and includes finger portions 24 of greater width than the spacer fingers 22 and which together with the face plate 18 and the spacer 20 form channeled pocket portions 25 (see Fig. 4).

In Fig. 1 I show two of the holder strips mounted on the base 12 each of which is hingedly secured thereto by a hinge strip 26.

The surface of the face of the base 12 on which the holder strips are mounted is preferably of a dark color except for reflecting light or white portions 27 beneath the holder strips 13.

The device 10 is adapted to hold a plurality of colored films 28 each of which includes a translucent film 29 mounted in an opaque frame or border member 30.

One of the frames 30 is positioned in each of the channeled pockets 25 of the film holder strips 13.

To view the films of one of the holder strips 13 an operator tilts the desired holder strip upward at an angle as shown in Fig. 2 whereupon light is reflected from the light portion 27 of the base 12 through the film.

To serve as a support and to increase the amount of reflected light I show a reflector member indicated at 31 (see Figs. 5 and 6). As shown the device 31 includes a glass mirror or other highly reflecting base member 32 having at one edge an opaque face member 33 hingedly secured thereto by a hinge strip 34. On the opposite edge the base 32 has a frosted Celluloid plate 35 hingedly secured thereto by a hinge strip 36.

Adjacent each end, intermediate the width thereof, the face plate 33 has an aperture 37 therein in which a rubber band 38 in positioned and which extends around the base 32. Intermediate the ends and a predetermined distance from the hinge edge the face plate 33 has a plurality of polygonal apertures 39 (see Fig. 6) therein which are shown as four in number to match the apertures 19 of the holder strips 13.

When the device 31 is not in use the Celluloid plate 35 is folded down against the base 32 and the face plate is folded down over the Celluloid plate with the rubber bands 38 retaining the device in a folded position.

When it is desired to use the device 31 for viewing the films 29 the face plate 33 is raised to an inclined position and the Celluloid plate 35 is raised to an inclined position where movement is restricted by the rubber bands 38 which also retain the face plate 33 in engagement with the upper edge of the Celluloid plate 35 as clearly shown in Fig. 5.

The desired holder strip 13 is then raised and the device 31 positioned on the base 12 behind the holder strip with the apertures 39 in the face plate 33 aligning with the apertures 39 in the holder strip. Whereupon light from any suitable source passes without glare through the frosted Celluloid plate 35 onto the mirror base 32 from which it is reflected through the apertures 39 and through the films 29.

The image of the frosted Celluloid plate 35 in the mirror base 32 forms a background against which the films 29 are viewed. The plate 35 is at such a distance from the film that the observer's eye cannot focus on both the film and the grain of the diffusing plate.

In Figs. 7 to 10, inclusive, I have indicated a modification of my invention generally at 40 which is particularly adapted for displaying in a viewing position a larger type film. As shown the device 40 includes a base plate 41 having a glass mirror 42 thereon between a rear edge strip 43 and an enlarged front edge strip 44. At each end the base plate 41 includes an upwardly bent lip 45, each of which supports an outwardly projecting threaded pin 46.

Mounted on the base 41 I provide a film holder indicated at 47, the construction of which is similar to the film holder strips 13 of the device 10. The holder 47 includes a face plate 48 having a plurality of polygonal apertures 49 therein and includes a spacer member 50 and a back member 51 which form a channeled film pocket 52 similar to the pockets 25 of the device 10 for each of the apertures 49. The holder member 47 is hingedly secured to the front base strip 44 by a flexible hinge strip 53.

Mounted on the rear base strip 43 I provide a frosted Celluloid plate 54 which is hingedly secured to the strip 43 by a flexible hinge member 55. Adjacent the edge of the Celluloid plate 54 opposite the hinge strip 53 and intermediate the length thereof the plate 54 has one end of a ribbon member 56 suitably secured thereto.

Adjacent the upper edge intermediate the length of the face plate 48 I provide a metal eyelet member 57 through which the ribbon 56 extends. The end of the ribbon 56 opposite the Celluloid plate 54 may have a ring member 58 or other gripping means secured thereto.

The eyelet 57 at one side thereof includes a ring portion 59 and in line therewith I provide a ring member 60 on the base strip 43. An elastic band 61 connects the rings 59 and 60 which, when the device is in an open position as shown in Fig. 1, resiliently urges the face plate 48 towards the base 41.

The device 40 is shown as housed in a box like metal case 62 having a cover 63 hingedly secured thereto as at 64. At each end the end walls of the case 62 have a slot 65 therein in which the threaded pins 46 of the base 41 are positioned. Positioned on each of the threaded pins 46 exterior of the case 62 I provide a thumb nut 66 which when tightened clamps the device 40 firmly to the case 62.

As shown in Fig. 9 when the device 40 is not being used it is folded down forwardly parallel to the mirror 42 and the film holder 47 is folded down rearwardly overlying the Celluloid plate 54. As the device is thus folded the ribbon 56 moves the grasping ring 58 to a position adjacent the eyelet 57. The device 40 may also be mounted on an album page similar to the device 13.

When it is desired to use the device 40 for display the case cover 63 is swung upwardly and rearwardly and then the operator grasps the ring 58 and pulls upwardly on the ribbon 56 which in turn pulls on the Celluloid plate 54 swinging it upward which in turn forces the film holder 47 upward against the action of the elastic band 61 until the upper edge of the plate 54 contacts the ring 59. Thereafter light from any suitable source passes through the frosted Celluloid plate 54 strikes the mirror 42 and is reflected therefrom through the apertures 49.

A weighted member 67 may be provided in the case 62 below the base 41 of the device 40 and the upper surface thereof may be shaped to allow the device 40 to be tilted forwardly or rearwardly.

In Fig. 11 I have indicated generally at 70 a film display device for use with a stereopticon viewing device indicated generally 71.

The display device 70 is similar to the device 10 and includes a base member 72 having film holder strips 73 similar to the holder strips 13 hingedly secured thereto as at 74 and which include film pockets 75 similar to the film pockets 25. The only difference between the device 70 and the device 10 is that in the device 70 the base 72 has apertures 76 therein in line with the film pockets.

The stereopticon device 71 includes a table portion 77 supported on a tiltable base member 78. In the upper surface thereof the table 77 has a glass mirror member 79 inserted therein and above the mirror a stereopticon viewing member 80 is supported at an angle by a bracket 81 mounted on the table 77. Pivotally secured to the viewing member 80 as at 82 I provide a frame 83 which supports a frosted glass plate 84. The face end of the frame 83 rests on the table 77 a predetermined distance from the mirror 79.

In use the film display device 70 is positioned on the table 77 with one set of the apertures 76 of the base 72 positioned over the mirror 79 and then the associated film holder 73 is raised to an inclined position to adjacent the viewing member 80 and may be retained in the inclined position by a pivoted hook member 85 provided on the member 80.

Light from any suitable source passes through the frosted glass plate 84 and through the apertures 76 in the base 72 and strikes the mirror 79 from which it is reflected towards the film pockets 75 which holds the film being viewed. After the films associated with one set of apertures have been examined the device is shifted so that the second set of apertures and their associated films will be visible to the observer.

From the foregoing description it will be apparent that I have provided a novel film viewing device which is simple in construction and highly efficient in use.

Having thus described my invention I claim:

1. A reflecting support including a reflecting base member, an opaque member hinged to one portion of the base member, and a light diffusing plate hinged to another portion of the base member, said diffusing plate hinge being disposed so that one edge of the plate engages the under surface of the opaque member, said opaque member having spaced display windows therein.

2. A reflecting support including a reflecting base member, an apertured opaque member hinged to one edge of the base member, a light diffusing plate hinged to the other edge of the base member, said diffusing member having a free edge engaging the under surface of the opaque member, and a elastic band threaded through said aperture, said band extending over the upper face of the opaque member below the lower face of the reflecting member and across the rear face of the diffusing member.

3. In a display device, a base member, a film holder, said film holder including a face plate having a plurality of apertures therein, a spacing member mounted on the face plate, the spacing member including finger portions having tapered ends with the finger portions disposed between the apertures, a cardboard back member secured to the spacing member, said cardboard back member having portions projecting beyond the spacer fingers to provide a series of pockets, means to hinge the back member to the base member, a support including a reflecting base member, an opaque member secured to one edge of the base member, a light diffusing plate secured to the other end of the base member, said diffusing member having a portion engaging the opaque member, said opaque member having apertures therein, said film holder engaging said support.

4. In a display device, a base member, a film holder, said film holder including a face plate having a plurality of opertures therein, a spacing member mounted on the face plate, the spacing member including finger portions having tapered ends with the finger portions disposed between the apertures, a cardboard back member secured to the spacing member, said cardboard back member having spaced fingers thereon of greater width than the width of the finger spacers and projecting beyond the spacer fingers to provide a series of pockets, means to hinge the back member to the base member, a reflecting support disposed beneath the back member, said support including a reflecting base member, an opaque member hinged to one edge of the base member, a light diffusing frosted Celluloid plate hinged to the other end of the reflecting base member, said diffusing member having a free edge engaging the under surface of the opaque member, said opaque member having apertures, and an elastic band threaded through said aperture, said band extending over the upper face of the opaque member below the lower face of the reflecting member and across the rear face of the diffusing member.

5. In a display device, a support, a base mounted on the support, a reflector on said base, a film holder hingedly mounted on the base, said film holder having an aperture therethrough, a film holding member disposed adjacent the aperture, and a light diffusing plate hinged to the base member, said plate being foldable against the base member and said holder being foldable over the plate.

6. In a display device, a container, a base plate pivotally mounted in the container, a mirror on said base plate, a film holder hingedly mounted on the base plate, said film holder having apertures therethrough, a pocket member disposed adjacent each aperture, and a light diffusing plate hinged to the base member, said plate being foldable against the base member and said holder being foldable over the plate.

7. In a display device, a container having a weighted member therein, a base plate pivotally mounted in the container, a mirror on said base plate, a film holder hingedly mounted on the base plate, said film holder having apertures therethrough, a pocket forming member disposed adjacent each aperture, a light diffusing plate hinged to the base member, said plate being foldable against the base member and said holder being foldable over the plate, an elastic band normally urging the holder towards the base and a flexible member connected to the plate and slidable through the holder for moving the holder and plate to operative position.

8. In a display device, a support, a stereopticon device on said support and including a lens barrel having its axis inclined relative to the support, a reflecting member on the support, a film holder movable to an adjusted position near the end of the stereopticon lens barrel, means to hold the film holder in adjusted position, and a light diffusing member movably mounted on the stereopticon device and movable to a position in the path of light rays to the reflecting member.

9. In a display device, a table, a stereopticon device on said table and including a lens barrel having its axis inclined relative to the table, a reflecting member on the table, a film holder on the table, said holder having a film supporting member pivoted thereto, said film holding member being movable to an inclined position near the end of the stereopticon lens barrel, means to hold the film holder in the inclined position, and a light diffusing member pivotally secured to the stereopticon device and movable to a position in the path of light rays to the reflector.

JOSEPH E. GRANT.